US012634351B2

(12) United States Patent
Jiang et al.

(10) Patent No.: US 12,634,351 B2
(45) Date of Patent: May 19, 2026

(54) ADVANCED MULTI-LAYER ACCESS CONTROL POLICY ENFORCEMENT IN A MULTI-TENANT CLOUD ENVIRONMENT

(71) Applicant: INTERNATIONAL BUSINESS MACHINES CORPORATION, Armonk, NY (US)

(72) Inventors: Peng Hui Jiang, Beijing (CN); Qi Feng Huo, Beijing (CN); Subramaniyan Nallasivam, Bangalore (IN); Dileep Dixith, Hyderabad (IN); Abhiram Kulkarni, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 18/749,880

(22) Filed: Jun. 21, 2024

(65) Prior Publication Data

US 2025/0392624 A1     Dec. 25, 2025

(51) Int. Cl.
H04L 29/00 (2006.01)
H04L 9/40 (2022.01)

(52) U.S. Cl.
CPC .............. H04L 63/20 (2013.01); H04L 63/10 (2013.01); H04L 63/1433 (2013.01)

(58) Field of Classification Search
CPC ...... H04L 63/20; H04L 63/10; H04L 63/1433
See application file for complete search history.

(56) References Cited

U.S. PATENT DOCUMENTS

| | | | | |
|---|---|---|---|---|
| 6,253,321 B1 * | 6/2001 | Nikander | ............ | H04L 63/0236 |
| | | | | 713/168 |
| 9,762,606 B2 * | 9/2017 | Chakra | ................. | G06F 21/577 |
| 10,268,565 B2 * | 4/2019 | Agarwal | ............. | G06F 11/3604 |
| 10,268,837 B2 * | 4/2019 | Agarwal | ................... | G06F 8/60 |
| 10,445,505 B2 * | 10/2019 | Rebelo | ................... | G06F 21/577 |
| 10,554,691 B2 * | 2/2020 | Meyers | ............... | H04L 63/1433 |
| 11,099,819 B1 * | 8/2021 | Fontecilla | ............. | G06F 16/953 |
| 11,151,024 B2 * | 10/2021 | Hwang | ............... | G06F 11/3024 |
| 11,188,450 B2 * | 11/2021 | Khan | ........................ | G06F 8/63 |

(Continued)

OTHER PUBLICATIONS

What is multitenancy? Multitenant architecture, Retrieved from Internet on Jun. 5, 2024: https://www.cloudflare.com/learning/cloud/what-is-multitenancy, copyright 2024 Cloudflare, Inc., 6 pages.

*Primary Examiner* — Don G Zhao
(74) *Attorney, Agent, or Firm* — CHIP LAW GROUP

(57) ABSTRACT

An approach is provided for multi-layer access control policy enforcement in a multi-tenant cloud environment. An advanced policy service is defined in a data container The advanced policy service provides management and validation of an access control policy at multiple levels including an application layer and a low layer, which is at a level lower than the application layer. Using the advanced policy service, a policy definition of the application layer is mapped to an access validation and authorization policy of the low layer. Rules are generated using an analysis of data packets by an eBPF program Using the eBPF program, the policy definition and the rules are applied to a request received from a SaaS application to access a data source. Based on the application of the policy definition and the rules, a data vulnerability is identified and the request is rejected.

20 Claims, 8 Drawing Sheets

(56)     References Cited

U.S. PATENT DOCUMENTS

| | | | |
|---|---|---|---|
| 11,297,085 B2* | 4/2022 | Albero | H04L 63/20 |
| 11,463,478 B2* | 10/2022 | Nadgowda | G06F 8/71 |
| 11,489,815 B2* | 11/2022 | Webb | H04L 69/16 |
| 11,556,315 B2* | 1/2023 | Fontecilla | G06F 3/0481 |
| 11,973,789 B2* | 4/2024 | Shemer | G06F 9/5027 |
| 12,184,689 B2* | 12/2024 | Mykytianskyi | H04L 63/0236 |
| 12,299,472 B2* | 5/2025 | Kaimal | H04L 63/108 |
| 2007/0230486 A1* | 10/2007 | Zafirov | H04L 43/12 |
| | | | 370/428 |
| 2015/0373644 A1* | 12/2015 | Sathy | H04W 52/0222 |
| | | | 370/311 |
| 2017/0147824 A1* | 5/2017 | Bennett | H04L 63/10 |
| 2017/0295181 A1* | 10/2017 | Parimi | H04L 67/535 |
| 2018/0278648 A1 | 9/2018 | Li | |
| 2019/0081981 A1* | 3/2019 | Bansal | H04W 12/122 |
| 2019/0260716 A1* | 8/2019 | Lerner | H04L 63/0876 |
| 2020/0099721 A1 | 3/2020 | Golan | |
| 2020/0267162 A1 | 8/2020 | Koottayi | |
| 2020/0336465 A1* | 10/2020 | Mestery | H04L 63/0263 |
| 2021/0314339 A1* | 10/2021 | Tsarfati | G06F 21/57 |
| 2022/0345480 A1* | 10/2022 | Shua | G06F 21/577 |
| 2023/0198964 A1 | 6/2023 | Viswambharan | |
| 2023/0281316 A1* | 9/2023 | Lewandowski | G06F 21/577 |
| | | | 726/22 |
| 2024/0129161 A1* | 4/2024 | Miriyala | H04L 41/122 |
| 2024/0129340 A1* | 4/2024 | Ramaswamy | H04L 63/1433 |
| 2024/0223616 A1* | 7/2024 | Bailey | H04L 63/1433 |
| 2024/0289463 A1* | 8/2024 | Mishra Gupta | G06F 21/577 |
| 2024/0394378 A1* | 11/2024 | Jackson | G06F 21/577 |
| 2025/0200170 A1* | 6/2025 | Knierim | G06F 21/57 |

* cited by examiner

100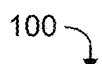

COMPUTER 101

PROCESSOR SET 110

PROCESSING CIRCUITRY 120        CACHE 121

COMMUNICATION FABRIC 111

VOLATILE MEMORY 112

PERSISTENT STORAGE 113

OPERATING SYSTEM 122      CODE FOR ADVANCED MULTI-LAYER ACCESS CONTROL POLICY ENFORCEMENT 200

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

*FIG. 1*

CODE FOR ADVANCED MULTI-LAYER ACCESS CONTROL POLICY ENFORCEMENT — 200

ADVANCED POLICY SERVICE MODULE — 202

DATA SOURCE APPLICATION MODULE — 204 eBPF PROGRAM MODULE — 206

LEARNING, ANALYSIS, AND APPLY SERVICE MODULE — 208

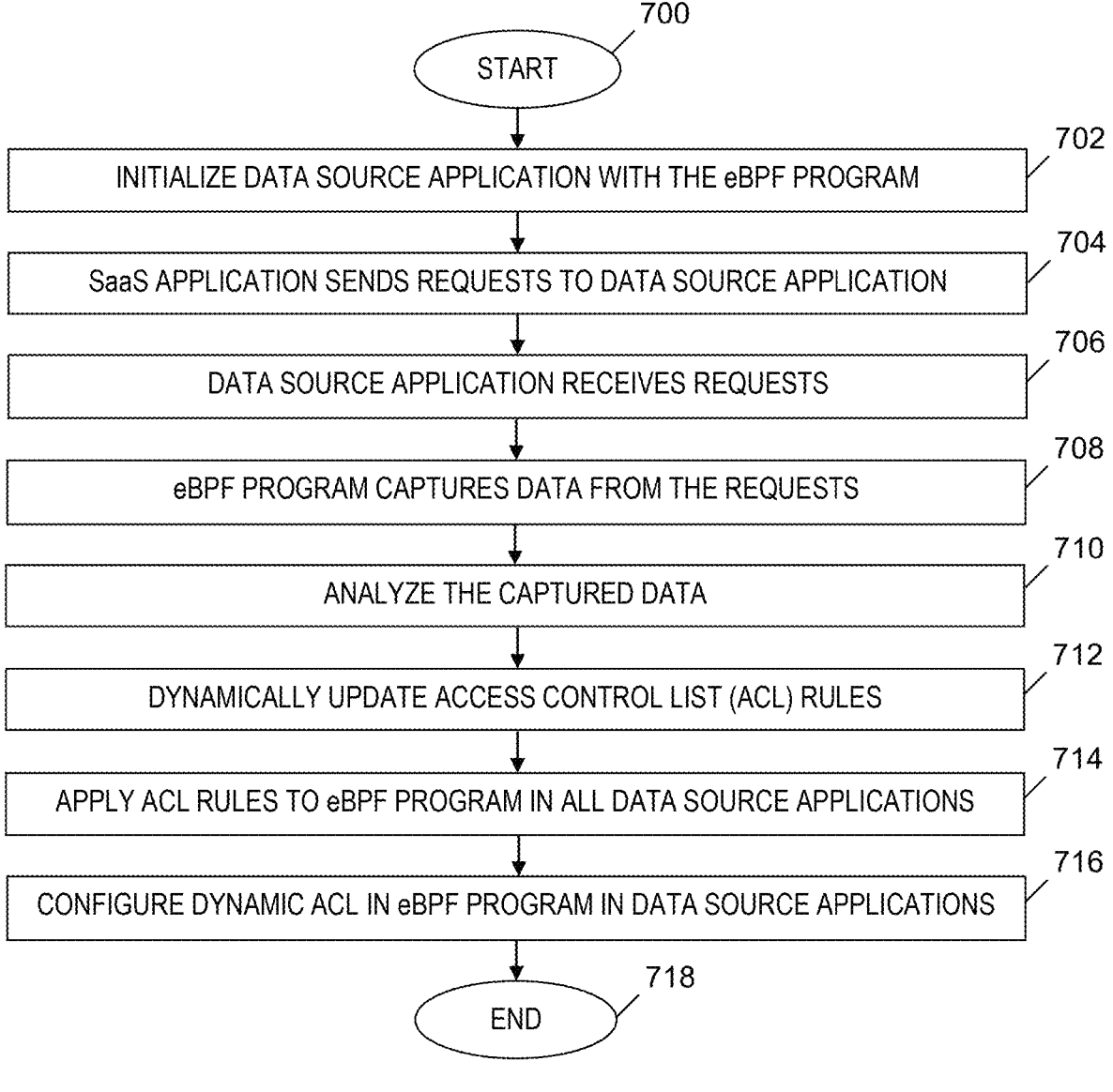

700

START

702

INITIALIZE DATA SOURCE APPLICATION WITH THE eBPF PROGRAM

704

SaaS APPLICATION SENDS REQUESTS TO DATA SOURCE APPLICATION

706

DATA SOURCE APPLICATION RECEIVES REQUESTS

708 eBPF PROGRAM CAPTURES DATA FROM THE REQUESTS

710

ANALYZE THE CAPTURED DATA

712

DYNAMICALLY UPDATE ACCESS CONTROL LIST (ACL) RULES

714

APPLY ACL RULES TO eBPF PROGRAM IN ALL DATA SOURCE APPLICATIONS

716

CONFIGURE DYNAMIC ACL IN eBPF PROGRAM IN DATA SOURCE APPLICATIONS

718

END

*FIG. 7*

ADVANCED MULTI-LAYER ACCESS CONTROL POLICY ENFORCEMENT IN A MULTI-TENANT CLOUD ENVIRONMENT

BACKGROUND

The present invention relates to data security, and more particularly to securing distributed data that is part of a multi-tenant application.

SUMMARY

In one embodiment, the present invention provides a computer-implemented method. The method includes defining an advanced policy service in a data container. The advanced policy service provides a management and a validation of an access control policy at multiple levels including an application layer and a low layer. The low layer is at a level lower than the application layer. The method further includes mapping, using the advanced policy service, a policy definition of the application layer to an access validation and authorization policy of the low layer. The method further includes generating rules using an analysis of data packets by an eBPF program. The method further includes applying, using the eBPF program, the policy definition and the rules to a request received from a SaaS application to access a data source. The method further includes, based on the application of the policy definition and the rules, identifying a data vulnerability and rejecting the request.

A computer system and a computer program product corresponding to the above-summarized computer-implemented method are also described herein.

BRIEF DESCRIPTION OF THE DRAWINGS

FIG. 1 is a block diagram of a system for enforcing a multi-layer access control policy in a multi-tenant cloud environment, in accordance with embodiments of the present invention.

FIG. 7 is a flowchart of a process of initializing dynamic rules used in the process of FIG. 3, in accordance with embodiments of the present invention.

DETAILED DESCRIPTION

Overview

Figure 2:
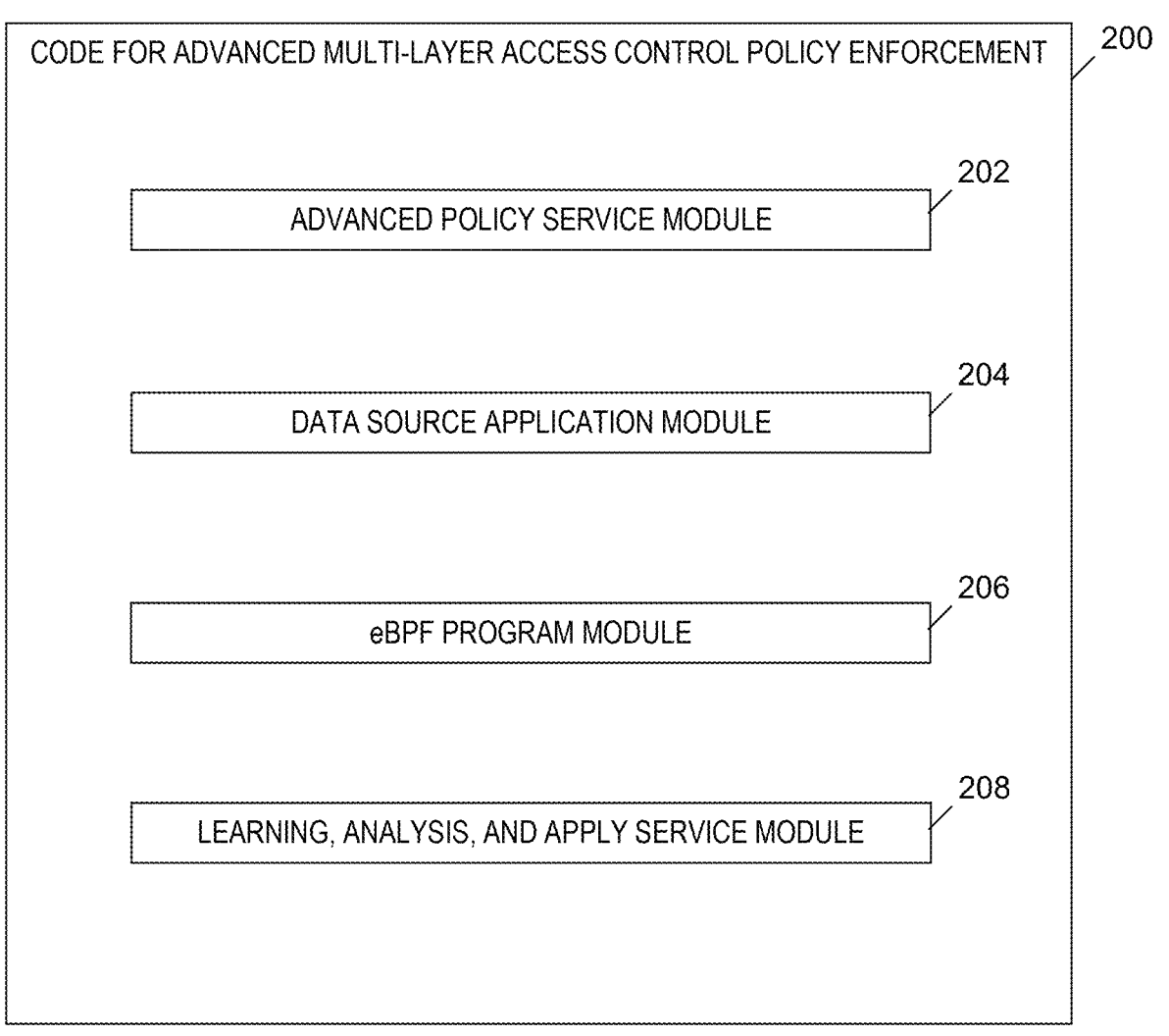
FIG. 2 is a block diagram of modules included in code included in the system of FIG. 1, in accordance with embodiments of the present invention.

A multi-tenant cloud in a multi-tenant cloud environment is a cloud computing architecture that allows customers to share computing resources in a public or private cloud. Data belonging to each tenant in the multi-tenant cloud is isolated and remains invisible to other tenants.

A multi-tenant application accesses distributed data, and the data is shared across co-tenants. Cloud-native applications and services use the portability of containers at scale, which helps enterprises to modernize mission-critical applications and create new applications faster in a hybrid cloud environment with less effort.

Any Software as a Service (SaaS) application trying to access the tenants' data must have administration privilege so that users and its corresponding data can be managed. Data exchange across containers and processes running on a physical system, however, stay inside the operating system and never hit the network wire.

Data management in a multi-tenant cloud environment is critical because several users use the same applications, systems, and data, but each of the users requires data privacy and data confidentiality. A malicious tenant can launch an attack towards a co-resident tenant in the same cloud environment. Role-based access control techniques do not scale well in a multi-tenant cloud environment because these techniques are usually based on user identifiers. Furthermore, a SaaS application accessing the multi-tenant data may generate flawed access control policies at both the application level and at a low level (e.g., Kernel layer), thereby creating a data vulnerability.

Significant challenges faced by a multi-tenant application in a multi-tenant cloud environment include data security and privacy problems. While multi-tenant users are separated from each other virtually, these users are physically integrated by means of sharing the data. In cases in which data is shared across multi-tenant users and multi-tenant applications, and there is a lack of data isolation, the multi-tenant cloud infrastructure becomes a prime target of cyberattacks. Side channel attacks against co-tenants can happen because of a lack of authorization controls.

If administrative privilege of a SaaS application is compromised, then data vulnerability may result. For example, one tenant may be allowed to gain access to data belonging to another tenant. Furthermore, a role-based access control policy being compromised by a SaaS application may result in a vulnerability of data access in the data container, thereby negatively impacting other SaaS applications running in the multi-tenant cloud.

Embodiments of the present invention address the aforementioned unique challenges by using an advanced policy service that manages and validates the Access Control Policy at a multi-layer level (e.g., application level) and at a low layer (e.g., Kernel layer). In one embodiment, the kernel or other low level's access validation and authorization and the application level's policy definition are mapped at the advanced policy service layer to interpret and convert. In one embodiment, a policy set is defined in a low layer and the application layer follows the policy set to specify rules. In one embodiment, data is protected at various levels (e.g., at the application level and the kernel level), including from the application to the data store, or from the application to another application, or within the application. In one embodiment, a system employs the advanced multi-layer access control policy to introduce access validation through the use of a grouping technique to reduce the frequency of validation access, thereby avoiding a negative impact on the performance of the system. The grouping technique includes grouping multiple calls to a database for a user in a single database transaction, thereby allowing the access validation to be performed one time for the group.

In one embodiment, the advanced multi-layer access control policy enforcement disclosed herein provides (1) enhanced data security and ensures data confidentiality and integrity by providing robust, granular access control, which reduces the risk of data breaches and unauthorized access attempts in multi-tenant cloud environments; (2) optimized system performance with minimized system downtime by ensuring efficient resource utilization in an access control system, which includes preventing resource wastage and bottlenecks and enhancing user experiences through streamlined access control processes; and (3) compliance assurance, whereby adaptable policies and dynamic access controls ensure compliance with regulatory and data privacy standards and the safeguarding of sensitive data, thereby reducing legal risks and fostering tenant trust.

Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer-readable storage media (also called "mediums") collectively included in a set of one, or more, storage devices, and that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a block diagram of a system for enforcing a multi-layer access control policy in a multi-tenant cloud environment, the system being a computing environment 100, in accordance with embodiments of the present invention. Computing environment 100 contains an example of an environment for the execution of at least some of the computer code involved in performing the inventive methods, such as code 200 for advanced multi-layer access control policy enforcement. The aforementioned computer code is also referred to herein as computer-readable code, computer-readable program code, and machine readable code. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

System and Process for Multi-Layer Access Control Policy Enforcement

FIG. 2 is a block diagram of modules included in code 200 included in the system of FIG. 1, in accordance with embodiments of the present invention. Code 200 includes an advanced policy service module 202, a data source application module 204, an eBPF program module 206, and a learning, analysis, and apply service module 208. The "eBPF" in eBPF program module 206 is a pseudo-acronym and refers to a technology that allows programs to run in a privileged context of an operating system kernel without requiring a change to kernel source code or a loading of a kernel module. Originally, eBPF was an acronym that referred to extended Berkeley Packet Filter.

Advanced policy service module 202 is configured to receive a high-level policy (e.g., a policy at an application layer) for data access by a SaaS application in response to the SaaS application being registered. Advanced policy service module 202 is further configured to send a predefined policy for data access in response to eBPF program module 206 requesting a retrieval of the pre-defined policy.

Data source application module 204 is configured to receive requests from SaaS applications for access to data managed by the data source application module 204. Data source application module 204 is further configured to be initialized with a trusted operating system residing in a trusted execution environment. Data source application module 204 is further configured to initialize an eBPF program executed by the eBPF program module.

The eBPF program module 206 is configured to retrieve a pre-defined policy for data access from a policy service provided by advanced policy service module 202. In one embodiment, eBPF program module 206 is further configured to capture data in data packets of requests sent by SaaS applications. In another embodiment, eBPF program module 206 is configured to direct learning, analysis, and apply service module 208 to capture the data in the data packets of the requests sent by the SaaS applications.

Learning, analysis, and apply service module 208 is configured to analyze data captured from data packets of requests sent by SaaS applications. The analysis of the captured data includes (i) using packet decoding to extract and analyze Uniform Resource Locators (URLs), request headers, and response headers; (ii) inspecting the content of requests and responses to detect malicious responses, attempts of code injection, and sensitive data leakage; (iv) detecting data traffic patterns and anomalies by using machine and behaviors analysis; and (v) detecting security threats including database-related attacks indicated by SQL injection or a known-attack pattern. Learning, analysis, and apply service module 208 is further configured to learn and populate rules based on the aforementioned data analysis, where the rules are applied by eBPF program module 206 against a request received from a SaaS application for an access of data. The application of the rules determines whether or not a data vulnerability is identified and whether the request is rejected or handled (i.e., processed so that the requested data is retrieved and returned to the SaaS application that requested the data).

Learning, analysis, and apply service module 208 is further configured to update access control list (ACL) rules dynamically, apply ACL rules to the eBPF program in all data source applications, and configure dynamic ACL rules in the eBPF program.

In one embodiment, learning, analysis, and apply service module 208 is included in eBPF program module 206.

The functionality of the modules included in code 200 is described in more detail in the discussions presented below relative to FIG. 3, FIG. 4, FIG. 5, FIG. 6, FIG. 7, and FIG. 8.

Figure 3:
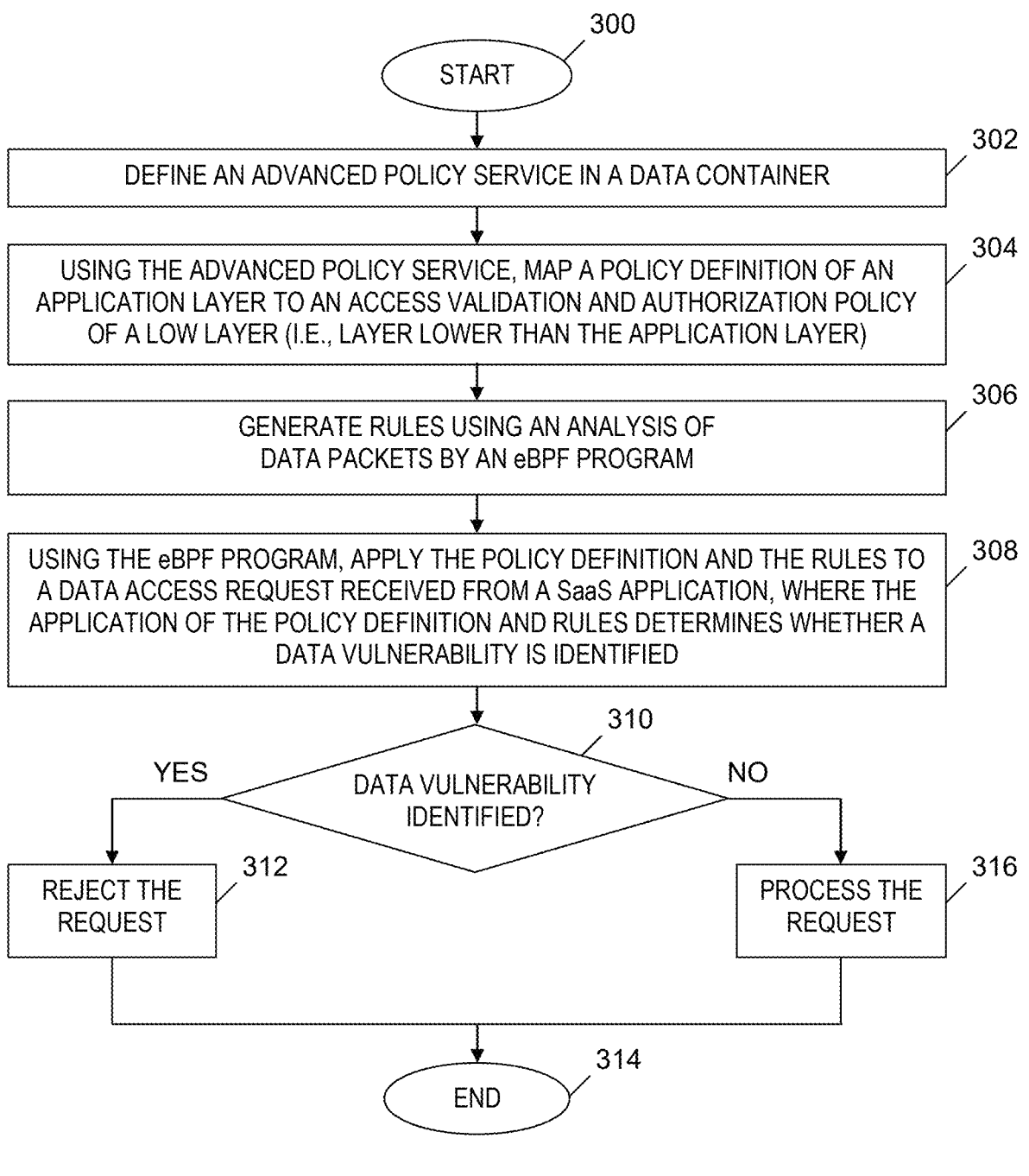
FIG. 3 is a flowchart of a process of enforcing a multi-layer access control policy in a multi-tenant cloud environment, where operations of the flowchart are performed by modules in FIG. 2, in accordance with embodiments of the present invention.

FIG. 3 is a flowchart of a process of enforcing a multi-layer access control policy in a multi-tenant cloud environment, where operations of the flowchart are performed by modules in FIG. 2, in accordance with embodiments of the present invention. The process of FIG. 3 begins at a start node 300. In step 302, a data source container defines an advanced policy service in the data source container. The advanced policy service is also referred to herein as simply the policy service.

In step 304, using the advanced policy service, the data source container maps a policy definition of an application layer to an access validation and authorization policy of a low layer. As used herein, a low layer is a layer lower than the application layer. As used herein, a layer refers to a layer included in an Open Systems Interconnection (OSI) model. In one embodiment, an eBPF program creates an access control mapping that includes access policies and associated SaaS applications.

In step 306, an eBPF program generates rule(s) using an analysis of data packets of data access requests sent by SaaS applications to a trusted execution environment that includes the data source container. As used in the discussion of FIG. 3, the eBPF program is included in eBPF program module 206, and includes a learning, analysis, and apply service whose functionality matches the functionality discussed above relative to learning, analysis, and apply service module 208.

In step 308, the eBPF program applies the policy definition and the rule(s) to a request received from a SaaS application to access data managed by a data source application executed by the data source container. The application of the policy definition and the rule(s) includes attempting to identify a data vulnerability that would result from processing the request.

In step 310, the eBPF program determines whether a data vulnerability is identified responsive to step 308. If the eBPF program identifies a data vulnerability in step 310, then the Yes branch of step 310 is followed and step 312 is performed.

In step 312, the data source container rejects the request.

Following step 312, the process of FIG. 3 ends at an end node 314.

Returning to step 310, if the eBPF program does not identify a data vulnerability, then the No branch of step 310 is followed and step 316 is performed. In step 316, the data source container processes the request, which includes retrieving the requested data from a data repository and sending the retrieved data to the SaaS application that requested access to the data.

In one embodiment, an entry level controller and a return controller are defined in the advanced policy service. The entry level controller validates parameters against registered information in the advanced policy service, where the parameters are passed during an entry of a function. The return controller generates output that includes input for the next function call and performs a validation of the kind of output that is required to be passed to the next container or the next processor. Based on the validating performed by the entry level controller and the return controller, the advanced policy service identifies a discrepancy (e.g., between the parameters and the registered information). In response to identifying the discrepancy, the data source container in the advanced policy service blocks the function from proceeding.

In one embodiment, the advanced policy service identifies one or more system events and determines, based on the one or more system events, that an access control policy is defined for a given SaaS application to access a data source container.

Figure 4:
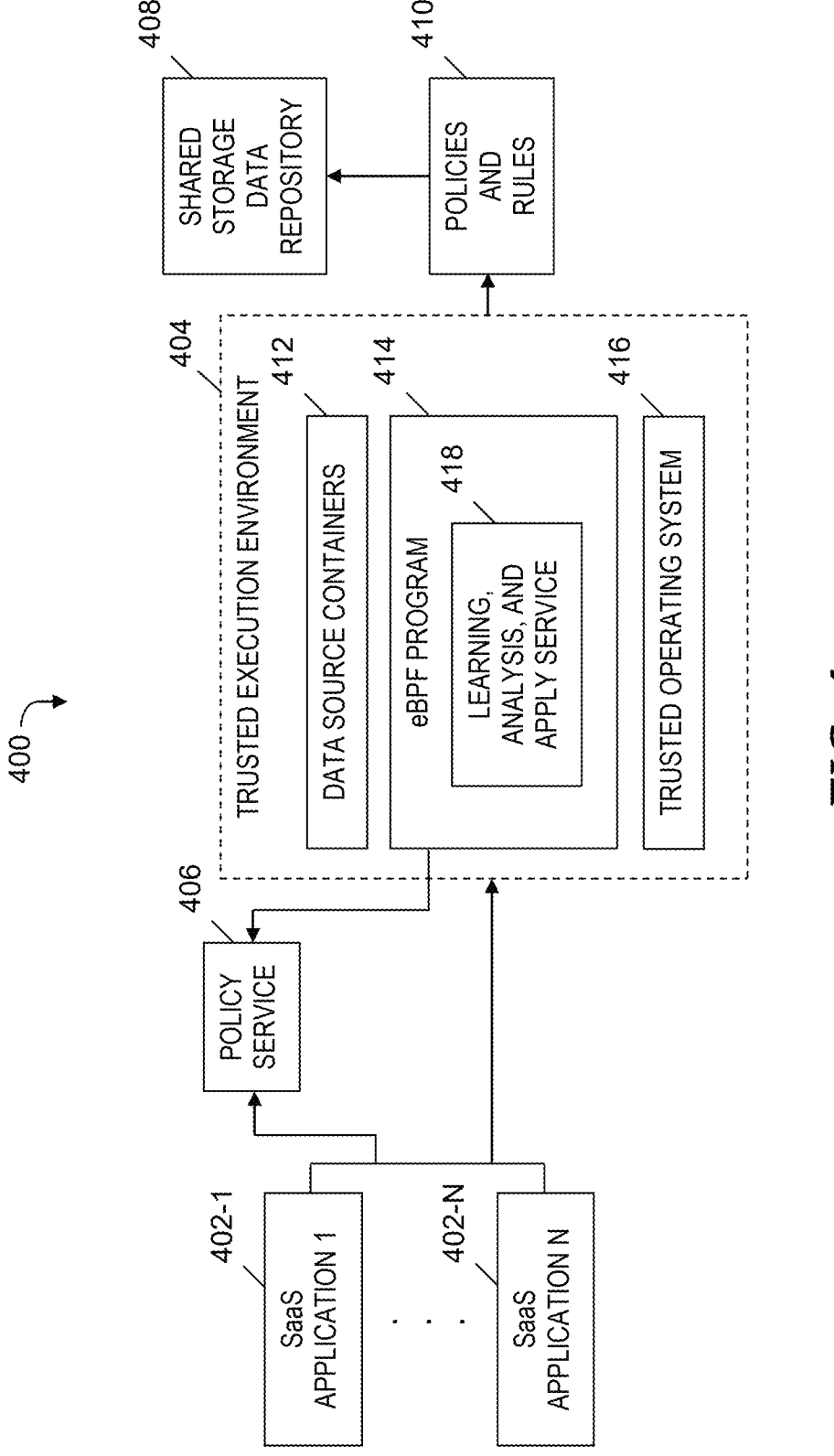
FIG. 4 is a block diagram of components that perform the operations in the flowchart of FIG. 3, in accordance with embodiments of the present invention.

FIG. 4 is a block diagram of components that perform the operations in the flowchart of FIG. 3, in accordance with embodiments of the present invention. System 400 includes N SaaS applications: SaaS application 402-1, . . . , SaaS application 402-N, where N is an integer greater than or equal to one. System 400 further includes a trusted execution environment 404, a policy service 406, a shared storage data repository 408, and policies and rules 410, which includes policies from policy service 406 and low level data access rules whose generation is described below. Trusted execution environment includes data source containers 412, an eBPF program 414, and a trusted operating system 416. The eBPF program 414 includes a learning, analysis, and apply service 418. The functionality of eBPF program 414 and learning, analysis, and apply service 418 matches the functionality of eBPF program module 206 and learning, analysis, and apply service module 208, respectively, as described above relative to the discussion of FIG. 2.

Data source containers 412 register the SaaS applications 402-1, . . . , 402-N, which register data access policies with policy service 406. SaaS applications 402-1, . . . , 402-N send data access requests to trusted execution environment 404, where data source containers 412 receive the requests. Data source containers 412 execute data source applications. The data access requests are requests to access shared data which is hosted as a data container.

The eBPF program 414 validates container level shared data using packet filtering. Furthermore, the eBPF program 414 learns rules for accessing the requested data by capturing data packets of each request from SaaS applications 402-1, . . . , 402-N and analyzing the data packets. The analysis of the data packets is discussed in more detail below relative to the discussion of FIG. 5. Using the results of the analysis of the data packets, eBPF program 414 generates rules for data access included in policies and rules 410. The generated rules are rules for data access at a low level (i.e., at a level lower than the application layer). The eBPF program 414 populates policies from policy service 406 and the generated rules in shared storage data repository 408. The rules generated by eBPF program 414 are outside the control of data source containers 412. In one embodiment, the aforementioned capture of the data packets and the analysis of the data packets are performed by learning, analysis, and apply service 418.

Figure 5:
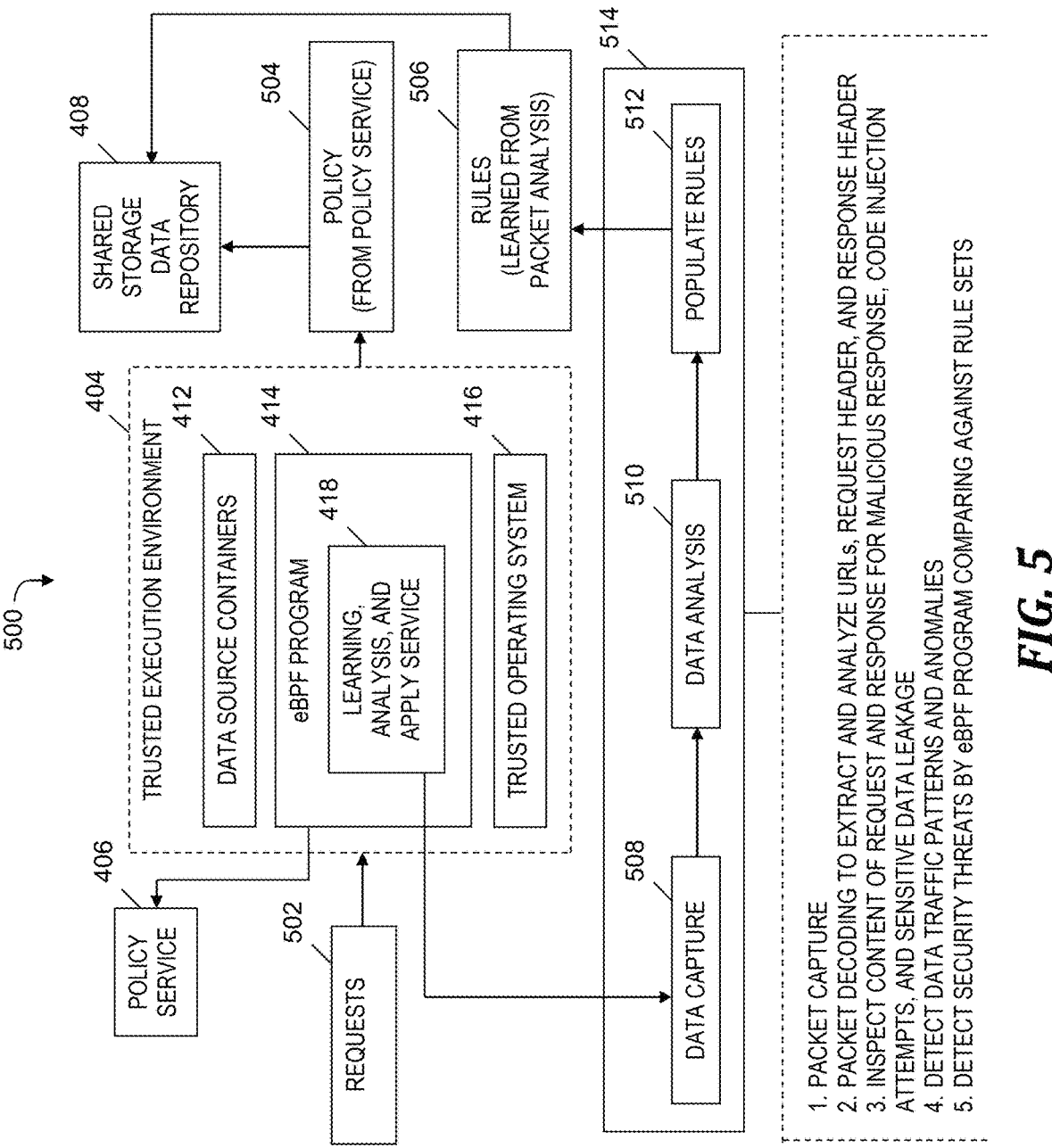
FIG. 5 is a block diagram of components that perform the operations in the flowchart of FIG. 3, including a pre-defined policy and rules learned from packet analysis, and further including process steps performed by a learning, analysis, and apply service, in accordance with embodiments of the present invention.

FIG. 5 is a block diagram of components in a system 500 that perform the operations in the flowchart of FIG. 3, including a pre-defined policy and rules learned from packet analysis, and further including process steps performed by a learning, analysis, and apply service, in accordance with embodiments of the present invention. System 500 includes trusted execution environment 404, policy service 406, and shared storage data repository 408, which are described above relative to the discussion of FIG. 4. As discussed above relative to the discussion of FIG. 4, trusted execution environment includes data source containers 412, eBPF program 414, and trusted operating system 416. The eBPF program 414 includes learning, analysis, and apply service 418. System 500 includes requests 502, which are sent by SaaS applications 402-1, . . . , 402-N and received by trusted execution environment 404. System 500 also includes a policy 504 from policy service 406 and rules 506, which are learned from packet analysis performed by learning, analysis, and apply service 418, as directed by eBPF program 414. Policy 504 and rules 506 are included in policies and rules 410 in FIG. 4.

Learning, analysis, and apply service 418 performs steps 514, which include data capture 508, data analysis 510, and populate rules 512. Data capture 508 includes capturing data packets from requests 502 and decoding the data packets, which includes decoding Hypertext Transfer Protocol (HTTP) packets in the requests 502, including headers and payloads, to extract and analyze URLs, request headers, and response headers.

Data analysis 510 includes detecting malicious responses, code injection attempts, and sensitive data leakage by inspecting the content of the HTTP requests included in requests 502 and responses to the HTTP requests. Data analysis 510 further includes identifying data traffic patterns and anomalies associated with the requests 502 by using machine and behaviors analysis. Data analysis 510 further includes detecting other security threats including database related attacks by detecting SQL injection and known-attack patterns, which is performed by eBPF program 414 comparing results of data analysis 510 with rule sets included in rules 506. For example, eBPF program 414 identifies a data vulnerability if data analysis 510 detect multiple attempts to login to a shared storage database in shared storage data repository 408 from a particular SaaS application.

Populate rules 512 includes eBPF program 414 populating shared storage data repository 408 with rules 506 learned from data analysis 510.

Figure 6:
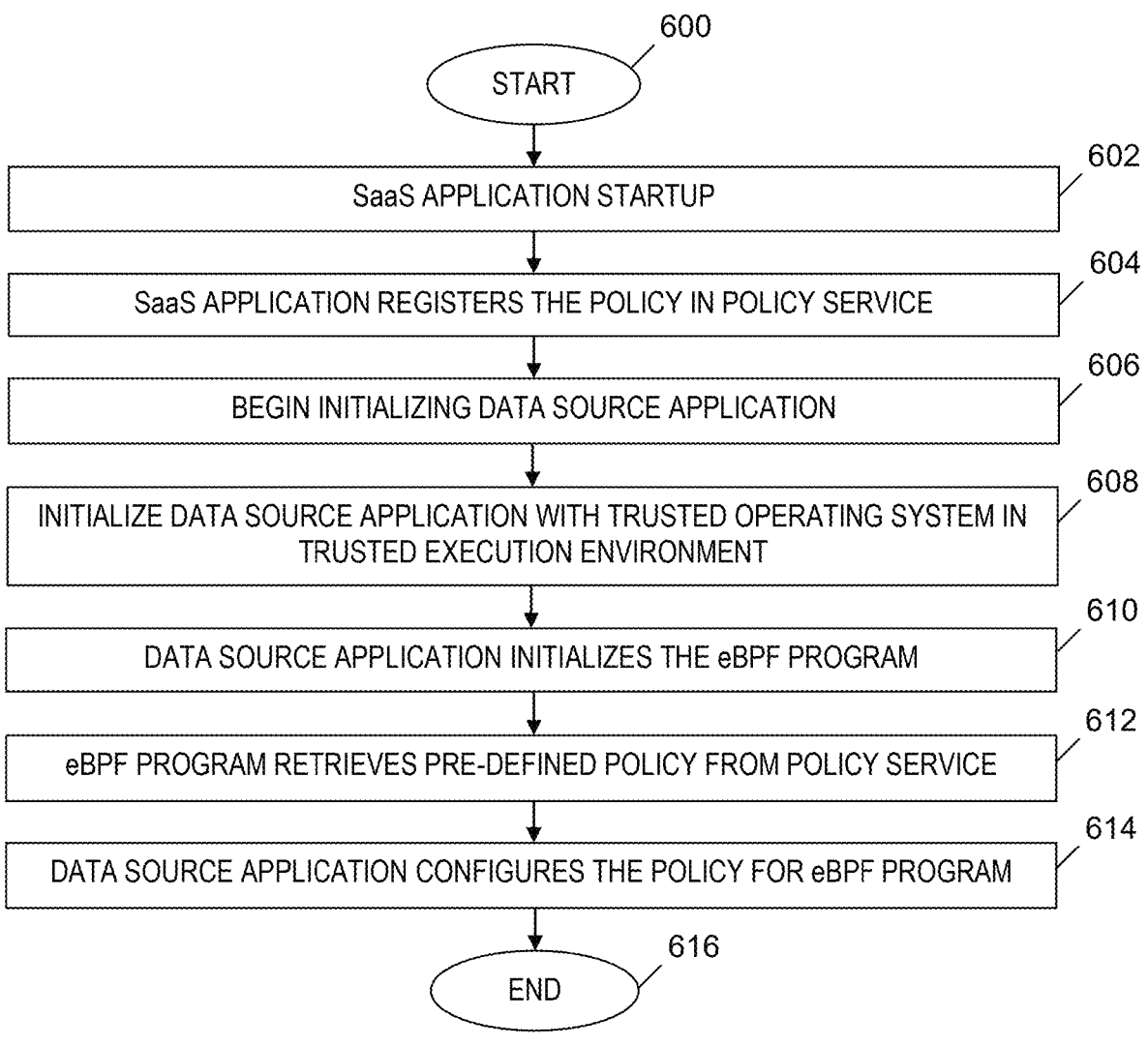
FIG. 6 is a flowchart of process of initializing a pre-defined policy used in the process of FIG. 3, in accordance with embodiments of the present invention.

FIG. 6 is a flowchart of process of initializing a pre-defined policy used in the process of FIG. 3, in accordance with embodiments of the present invention. The process of FIG. 6 begins at a start node 600. In step 602, a SaaS application included in the SaaS applications 402-1, . . . , 402-N starts up.

In step 604, the SaaS application that started in step 602 registers a pre-defined policy in policy service 406.

In step 606, a data source application executed by one of data source containers 412 begins its initialization process, which includes step 608.

In step 608, the data source application is initialized with trusted operating system 416 in trusted execution environment 404.

In step 610, the data source application initializes the eBPF program 414.

In step 612, the eBPF program 414 retrieves the pre-defined policy (i.e., policy 504) from policy service 406.

In step 614, the data source application configures the policy retrieved in step 612 for the eBPF program 414. The data source application interprets and converts the policy (i.e., a high level policy) retrieved in step 612 into a low level policy (i.e., rule) that can be applied by the eBPF program 414 to a data access request. For example, the low level policy allows the eBPF program 414 to be able to identify the role of the user who is attempting to access the data via the request, and to determine the kind of data that user wants to access, thereby allowing an application of the low level policy by eBPF program 414 to identify a data vulnerability and reject the request.

Following step 614, the process of FIG. 6 ends at an end node 616.

FIG. 7 is a flowchart of a process of initializing dynamic rules used in the process of FIG. 3, in accordance with embodiments of the present invention. The process of FIG. 7 begins at a start node 700. In step 702, a data source application is initialized with the eBPF program 414. The data source application is executed by one of the data source containers 412.

In step 704, a SaaS application included in SaaS applications 402-1, . . . , 402-N sends requests to the data source application that is initialized in step 702.

In step 706, the data source application receives the requests sent in step 704.

In step 708, the eBPF program 414 captures data from the requests by performing data capture 508.

In step 710, the eBPF program 414 analyzes the data captured in step 708 by performing data analysis 510.

In step 712, learning, analysis, and apply service 418 dynamically updates access control list (ACL) rules based on the analysis of the data in step 710.

In step 714, learning, analysis, and apply service 418 applies the ACL rules updated in step 712 to the eBPF program 414 in all data source applications.

In step 716, learning, analysis, and apply service 418 configures the ACL rules in eBPF program 414 in the data source applications, where the rules being configured are the rules updated in step 712.

Following step 716, the process of FIG. 7 ends at an end node 718.

Figure 8:
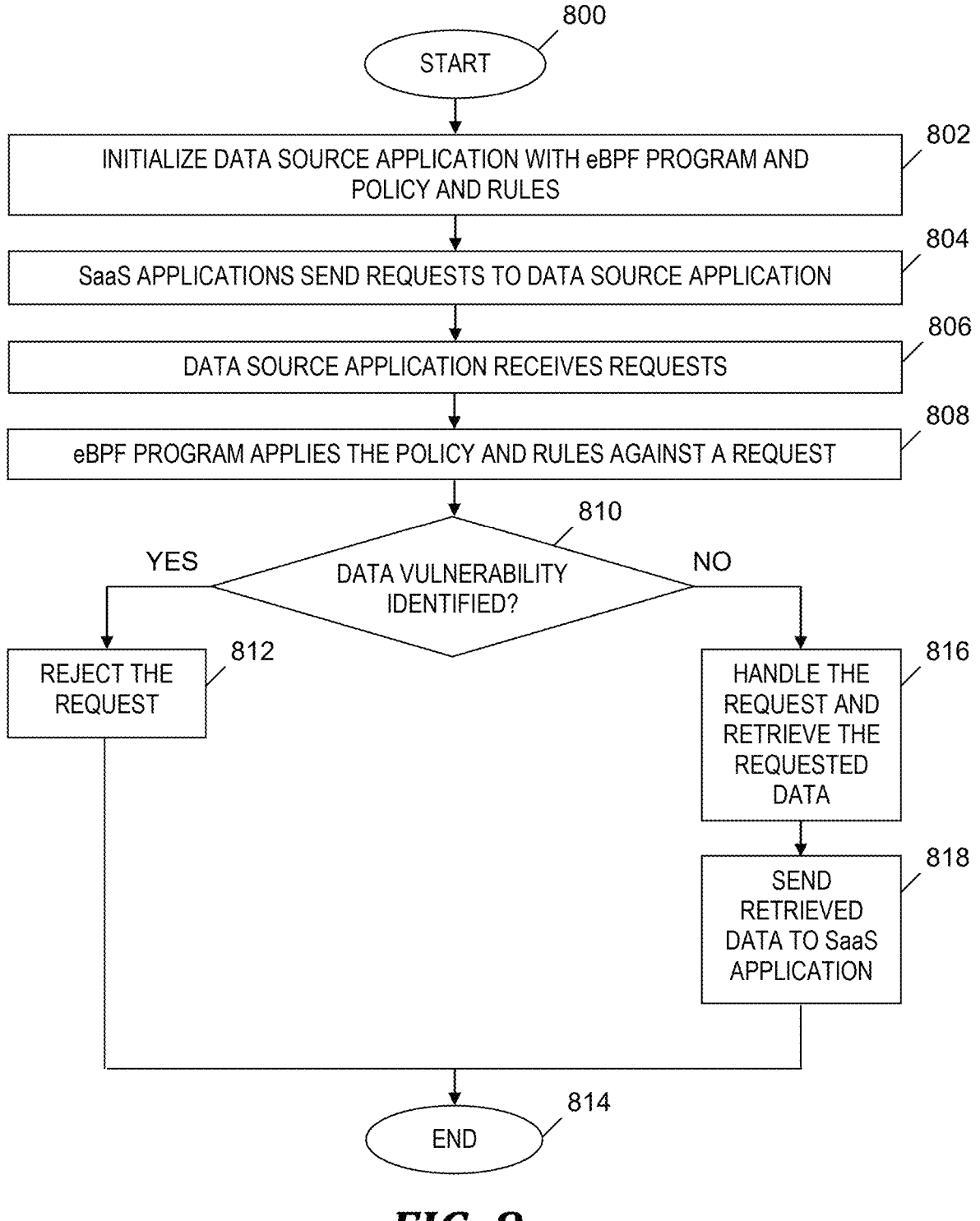
FIG. 8 is a flowchart of an example of a data request process performed by the components in FIG. 4, in accordance with embodiments of the present invention.

FIG. 8 is a flowchart of an example of a data request process performed by the components in FIG. 4, in accordance with embodiments of the present invention. The process of FIG. 8 begins at a start node 800. In step 802, a data source application is initialized with eBPF program 414 and policy and rules included in policies and rules 410.

In step 804, SaaS applications 402-1, . . . , 402-N send data access requests to the data source application.

In step 806, the data source application receives the requests sent in step 804.

In step 808, the eBPF program 414 applies the aforementioned policy and the rules against a request included in the requests received in step 806, where applying the policy and rules attempts to identify a data vulnerability that exists, and where the request was sent by a particular SaaS application in step 804.

In step 810, the eBPF program 414 determines whether a data vulnerability is identified by the application of the policy and rules in step 808. If the eBPF program 414 identifies a data vulnerability in step 810, then the Yes branch of step 810 is followed and step 812 is performed. In step 812, the data source application rejects the request in response to the data vulnerability being identified. Following step 812, the process of FIG. 8 ends at an end node 814.

Returning to step 810, if the eBPF program 414 determines that a data vulnerability is not identified by the application of the policy and rules in step 808, then the No branch of step 810 is followed and step 816 is performed. In step 816, the data source application handles (i.e., processes) the request and retrieves the requested data from a data repository. In step 818, the data source application sends the retrieved data to the SaaS application that sent the request.

In one embodiment, the processes of FIG. 3 and FIG. 8 are each performed subsequent to the processes of FIG. 6 and FIG. 7.

What is claimed is:

1. A computer-implemented method, comprising:
defining an advanced policy service in a data container, the advanced policy service providing a management and a validation of an access control policy at multiple levels including an application layer and a low layer, the low layer being at a level lower than the application layer;
mapping, using the advanced policy service, a policy definition of the application layer to an access validation and authorization policy of the low layer;
generating rules using an analysis of data packets by an extended Berkeley Packet Filter (eBPF) program;
applying, using the eBPF program, the policy definition and the rules to a first request received from a Software as a Service (SaaS) application to access a data source; and
based on the applying of the policy definition and the rules, identifying a data vulnerability and rejecting the first request.

2. The computer-implemented method of claim 1, further comprising:
applying, using the eBPF program, the policy definition and the rules to a second request received from the SaaS application to access the data source; and
based on the application of the policy definition and the rules, determining that the data vulnerability is not identified and processing the second request.

3. The computer-implemented method of claim 1, further comprising:
providing the access validation by using a grouping technique, wherein the grouping technique reduces a frequency of validating access.

4. The computer-implemented method of claim 1, further comprising:
validating, by an entry level controller, parameters against registered information in the advanced policy service, the parameters being passed during an entry of a function;
based on the validating, identifying a discrepancy between the parameters and the registered information; and
based on the identifying of the discrepancy, blocking the function from proceeding, wherein the defining of the advanced policy service includes defining the entry level controller and a return controller in the advanced policy service.

5. The computer-implemented method of claim 1, further comprising:
identifying one or more system events; and
determining, based on the one or more system events, that the access control policy is defined for the SaaS application to access the data container.

6. The computer-implemented method of claim 1, further comprising:
capturing, by the eBPF program, the data packets from requests to access data, the requests being received from SaaS applications, wherein the SaaS applications include the SaaS application;
decoding, by the eBPF program, the data packets, wherein the decoding includes determining headers and payloads of the data packets and extracting Uniform Resource Locators, request headers, and response headers from the data packets; and
identifying a malicious response, an attempt of code injection, a leakage of sensitive data, an anomaly in a data traffic pattern, or a security threat by a detection of an SQL injection or a known attack pattern, wherein the capturing, the decoding, and the identifying are included in the analysis of the data packets by the eBPF program and are used in the generating of the rules.

7. The computer-implemented method of claim 1, further comprising:
defining a policy set in the low layer; and
specifying, at the application layer, a rule based on the policy set defined in the low layer.

8. A computer system, comprising:
a processor set;
a set of one or more computer-readable storage media; and
program instructions, collectively stored in the set of one or more computer-readable storage media, for causing the processor set to perform operations comprising:
defining an advanced policy service in a data container, the advanced policy service providing a management and a validation of an access control policy at multiple levels including an application layer and a low layer, the low layer being at a level lower than the application layer;
mapping, using the advanced policy service, a policy definition of the application layer to an access validation and authorization policy of the low layer;
generating rules using an analysis of data packets by an extended Berkeley Packet Filter (eBPF) program;
applying, using the eBPF program, the policy definition and the rules to a first request received from a Software as a Service (Saas) application to access a data source; and
based on the applying of the policy definition and the rules, identifying a data vulnerability and rejecting the first request.

9. The computer system of claim 8, wherein the operations further comprise:
applying, using the eBPF program, the policy definition and the rules to a second request received from the SaaS application to access the data source; and
based on the application of the policy definition and the rules, determining that the data vulnerability is not identified and processing the second request.

10. The computer system of claim 8, wherein the operations further comprise:

providing the access validation by using a grouping technique, wherein the grouping technique reduces a frequency of validating access.

11. The computer system of claim 8, wherein the operations further comprise:

validating, by an entry level controller, parameters against registered information in the advanced policy service, the parameters being passed during an entry of a function;

based on the validate the parameters, identifying a discrepancy between the parameters and the registered information; and based on the identifying of the discrepancy, blocking the function from proceeding, wherein the defining of the advanced policy service includes defining of the entry level controller and a return controller in the advanced policy service.

12. The computer system of claim 8, wherein the operations further comprise:

identifying one or more system events; and determining, based on the one or more system events, that the access control policy is defined for the SaaS application to access the data container.

13. The computer system of claim 8, wherein the operations further comprise:

capturing, by the eBPF program, the data packets from requests to access data, the requests being received from SaaS applications, wherein the SaaS applications include the SaaS application;

decoding, by the eBPF program, the data packets, wherein the decode of the data packets includes determine headers and payloads of the data packets and extract Uniform Resource Locators, request headers, and response headers from the data packets; and identifying a malicious response, an attempt of code injection, a leakage of sensitive data, an anomaly in a data traffic pattern, or a security threat by a detection of an SQL injection or a known attack pattern, wherein the capture, the decode, and the identifying of the malicious response, the attempt of the code injection, the leakage of the sensitive data, the anomaly in the data traffic pattern, or the security threat are included in the analysis of the data packets by the eBPF program and are used in the generating of the rules.

14. The computer system of claim 8, wherein the operations further comprise:

defining a policy set in the low layer; and specifying, at the application layer, a rule based on the policy set defined in the low layer.

15. A computer program product comprising:

a set of one or more computer-readable storage media; and program instructions, collectively stored in the set of one or more computer-readable storage media, for causing a processor set to perform operations comprising:

defining an advanced policy service in a data container, the advanced policy service providing a management and a validation of an access control policy at multiple levels including an application layer and a low layer, the low layer being at a level lower than the application layer;

mapping, using the advanced policy service, a policy definition of the application layer to an access validation and authorization policy of the low layer;

generating rules using an analysis of data packets by an extended Berkeley Packet Filter (eBPF) program;

applying, using the eBPF program, the policy definition and the rules to a first request received from a Software as a Service (Saas) application to access a data source; and based on the applying of the policy definition and the rules, identifying a data vulnerability and rejecting the first request.

16. The computer program product of claim 15, wherein the operations further comprise:

applying, using the eBPF program, the policy definition and the rules to a second request received from the SaaS application to access the data source; and based on the application of the policy definition and the rules, determining that the data vulnerability is not identified and processing the second request.

17. The computer program product of claim 15, wherein the operations further comprise:

providing the access validation by using a grouping technique, wherein the grouping technique reduces a frequency of validating access.

18. The computer program product of claim 15, wherein the operations further comprise:

validating, by an entry level controller, parameters against registered information in the advanced policy service, the parameters being passed during an entry of a function;

based on the validate the parameters, identifying a discrepancy between the parameters and the registered information; and based on the identify of the discrepancy, blocking the function from proceeding, wherein the defining of the advanced policy service includes defining of the entry level controller and a return controller in the advanced policy service.

19. The computer program product of claim 15, wherein the operations further comprise:

identifying one or more system events; and determining, based on the one or more system events, that the access control policy is defined for the SaaS application to access the data container.

20. The computer program product of claim 15, wherein the operations further comprise:

capturing, by the eBPF program, the data packets from requests to access data, the requests being received from SaaS applications, wherein the SaaS applications include the SaaS application;

decoding, by the eBPF program, the data packets, wherein the decode of the data packets includes determine headers and payloads of the data packets and extract Uniform Resource Locators, request headers, and response headers from the data packets; and identifying a malicious response, an attempt of code injection, a leakage of sensitive data, an anomaly in a data traffic pattern, or a security threat by a detection of an SQL injection or a known attack pattern, wherein the capture, the decode, and the identifying of the malicious response, the attempt of the code injection, the leakage of the sensitive data, the anomaly in the data traffic pattern, or the security threat are included in the analysis of the data packets by the eBPF program and are used in the generating of the rules.

* * * * *